May 20, 1969  H. HOFMANN  3,444,844
CROSSHEAD-TYPE INTERNAL COMBUSTION PISTON ENGINE
HAVING LIQUID-COOLED PISTONS
Filed March 24, 1967
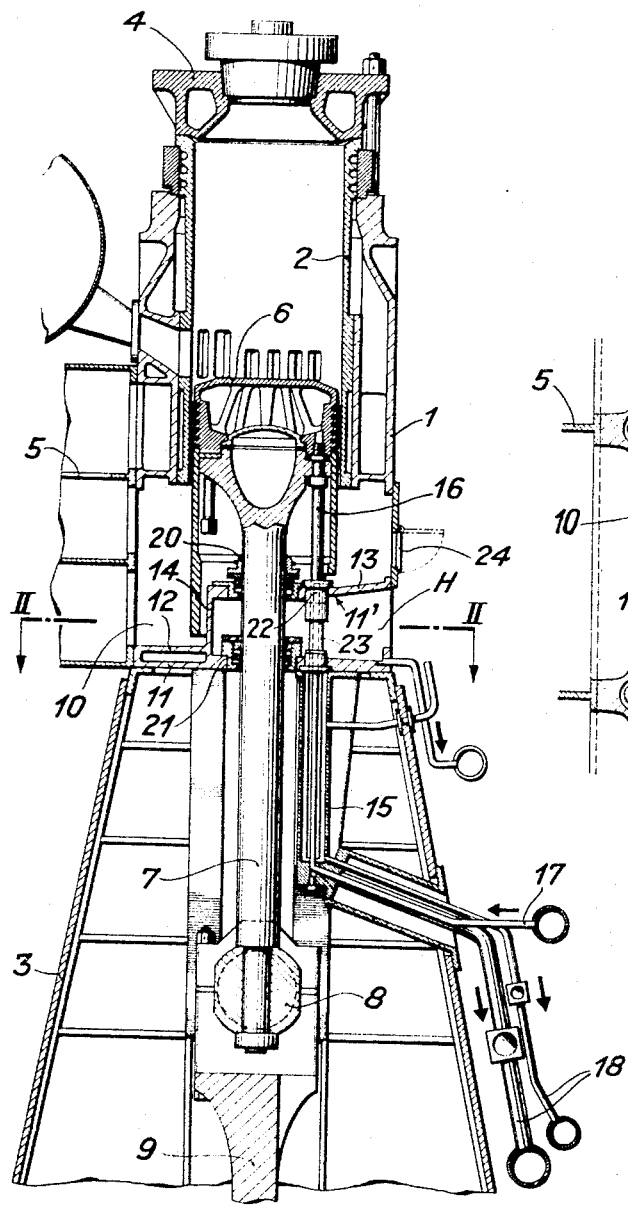
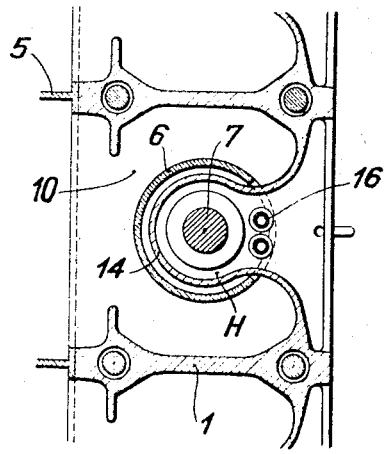
Inventor:
Hans Hofmann United States Patent Office 3,444,844
Patented May 20, 1969

3,444,844
CROSSHEAD-TYPE INTERNAL COMBUSTION PISTON ENGINE HAVING LIQUID-COOLED PISTONS
Hans Hofmann, Zurich, Switzerland, assignor to Sulzer Brothers Limited, Winterthur, Switzerland
Filed Mar. 24, 1967, Ser. No. 625,812
Claims priority, application Switzerland, Mar. 31, 1966, 4,687/66
Int. Cl. F01p 3/10
U.S. Cl. 123—41.36                                    1 Claim

ABSTRACT OF THE DISCLOSURE

There is disclosed an engine of the type set forth in the title in which the piston rod or rods and conduits for piston coolant pass through two spaced partitions disposed between the crosshead and the lower end of the engine cylinder or cylinders. Together these partitions close off the engine crankcase from the under side of the pistons, where compressed air for supercharging and/or scavenging may be generated or stored, and in addition they define a space closed off from both the crankcase and underside of the pistons but open to the exterior of the engine. Through this space there may be observed the portion of the piston rods and coolant conduits between the partitions and also the seals at which the piston rods and conduits pass through the partitions. For replacement of the seals in the upper partition an access door may be provided (e.g., at each cylinder if there are more than one) through the engine housing above the upper partition.

BACKGROUND OF THE INVENTION

Field of the invention

The invention pertains to internal combustion engines having piston rods supported in crossheads for parallel motion and having liquid-cooled pistons, and in which the space within the cylinders beneath the pistons is closed off from the crankcase by means of a partition through which the piston rod and piston coolant conduits pass at seals or packings.

Description of the prior art

It has already been proposed to provide such engines with recesses in the cylinder housings through which the coolant tube seals are accessible from the exterior. Independently thereof it has been heretofore proposed to seal off the space within the cylinders and beneath the pistons, i.e., the under side of the pistons, from the crankcase by means of a partition. In two-stroke cycle engines, to which the invention is particularly applicable, this space contains supercharging air having a pressure of one or more atmospheres above atmospheric and may become contaminated with residual products of combustion which get past the pistons.

SUMMARY OF THE INVENTION

The invention provides an engine which, notwithstanding mechanical simplification by comparison with the prior art, provides better accessibility to all of the seals through the partitions, of whatever form, which separates the crankcase from the under side of the pistons and which at the same time provides a better protection against contamination of the crankcase by residual products of combustion. In addition, in the construction of the invention the portions of the seals which are subject to wear are more readily replaced than in the constructions heretofore employed. In particular, the invention provides an engine having two partitions through which the piston rods and piston coolant tubes pass. These partitions, one or more of which may be double walled, not only close off the crankcase from the pressurized under side of the pistons but define a space, which may be open to the exterior of the engine, through which the piston rods and coolant tubes pass and where their condition, and hence that of their seals in these partitions, may be readily observed during operation of the engine.

BRIEF DESCRIPTION OF THE DRAWINGS

The invention will now be further described in terms of a nonlimitative example and with reference to the accompanying drawings in which:

FIG. 1 is a transverse axial section through a cylinder of an internal combustion engine embodying the invention; and FIG. 2 is a section taken on the line II—II of FIG. 1.

DESCRIPTION OF PREFERRED EMBODIMENT

Referring to FIGS. 1 and 2, the engine of FIG. 1 includes a cylinder housing 1 having a cylinder proper or liner 2 therein. A crankcase 3 connects to the lower end of the cylinder housing. The liner 2 is closed by means of a cylinder head 4. At one side of the engine there is provided in fixed position with respect to the housing 1 a supercharging air chest 5, fragmentarily shown. A piston 6 moves in the liner 2, the piston being coupled by means of a piston rod 7 with a crosshead 8 from which a connecting rod 9 leads in known fashion to the crankshaft of the engine, not shown. The lower end of the cylinder housing defines an air space 10 communicating with the interior of the cylinder 2 below the piston, i.e., with the under side of the piston. The space 10 extends around the liner 2 and connects with the air chest 5. The air space 10 is separated from the crankcase 3 by means of a lower partition 11 and an upper partition generally indicated at 11'. The partition 11 extends from one side of the housing 1 to the other, and by itself closes off the crankcase 3 from the under side of the pistons. The upper partition 11' includes a flat plate 12, a cylindrical (but noncircular) vertical wall 14, and a cover portion 13 over the space to the right of the wall 14 as the engine is seen in the drawings. The wall 14, cover 13 and lower plate 11 define a space H which is closed off from the space 10 but which is open to the exterior of the engine, on the right side thereof in FIG. 1. The lower partition 11 has affixed thereto a vessel 15 into which extend tubes 16 which are fastened to and move with the piston. These tubes constitute part of a conduit system for the supply of coolant to the piston and for withdrawal of coolant therefrom. Thus the vessel 15 is provided with a conduit 17 for the supply of coolant such as water and with conduits 18 for withdrawal thereof. This coolant conduit system may be of the type disclosed and claimed in the application of Gosen Joop Hellingman, filed on or about Mar. 16, 1967, which is assigned to the assignee of the present application.

The piston rod 7 passes through a seal 20 in the cover 13 and also through a seal 21 in the lower partition 11. The coolant tubes 16 pass through a seal 22 in the cover 13 and may thence extend without additional seal into the vessel 15. It is however possible to provide the tubes 16 with an easily removable enclosure 23 between the seal 22 and the vessel 15, the enclosure 23 being, for example, transparent or easily withdrawn so as to make possible inspection of the surface of the coolant tubes without permitting entrance of foreign matter such as residual products of combustion into the vessel 15.

As is shown in FIG. 2, the vertical wall portion 14 laterally bounding the space H is so formed that the piston rod 7 and the coolant tubes 16 are visible and accessible through the space H from the exterior of the engine. Consequently, observation of the condition of these parts and of the condition of the seals is continuously possible. According as the piston rod bears on its surface lubricating oil from the crankcase or residual products of combustion from the space 10 beneath the cylinder, conclusions can be drawn as to the condition of the upper and lower packings 20 and 21.

In order to make possible quick replacement of those portions of the seals 20 and 22 which are subjected to wear, the cylinder housing 1 is provided with an access door 24 opening into the space 10. This door can be opened when the engine is stopped, i.e., when no supercharging or scavenging air pressure exists in the space 10. Through this door the seals 20 and 22 and the wearing parts thereof are readily accessible and replaceable.

The double wall partition formed by the elements 11, 12, 13 and 14 provides thermal insulation between the crankcase and the space 10, and the space 14 constitutes a neutral space between the two. Materials such as lube oil and residual products of combustion which have passed into the space H through the seals 20, 21 and 22 together with the lubricating oil of the cylinder can be withdrawn from this intermediate or neutral space and do not pass from the crankcase to the space inside the liner 2 and below the piston, or vice versa.

The construction hereinabove described may be regarded as including two partitions each extending entirely across the cylinder housing and each closing off, by itself and independently of the other, the crankcase from the under side of the pistons. On this view of the construction illustrated, the plate 12 forms part of the upper partition and neither of the partitions shown in the drawing is, by itself, double walled. Alternatively, the construction illustrated may be regarded as comprising one partition which extends entirely across the cylinder housing and a second partition which extends only part-way across the cylinder housing, but which with the first partition defines the space H closed off from the under side of the pistons and also from the crankcase. With this point of view, the lower partition includes the plate 12 and is hence a partition which is double walled exteriorly of the space H defined between the two partitions. From this viewpoint, therefore, the upper partition comprises only the cylindrical portion 14 and the cover 13.

While the invention has been described herein in terms of a presently preferred embodiment, the invention is not limited thereto but rather comprehends all variations on and departures from that embodiment properly falling within the spirit and scope of the appended claim.

I claim:

1. An internal combustion engine comprising a cylinder housing, a cylinder disposed in the housing, a cylinder head closing one end of the cylinder, a piston movable within the cylinder, a crankcase, a crosshead movably disposed in the crankcase, a piston rod extending through the other end of the cylinder and connected between the piston and crosshead, conduit means affixed to the piston for supply of liquid coolant thereto, a supercharging air chest communicating with said other end of the cylinder, a lower partition traversed by the piston rod and conduit means and closing off the crankcase from the cylinder, an upper partition traversed by the piston rod and conduit means and extending at least part-way across the cylinder housing, said partitions defining between them a space traversed by the piston rod and conduit means which is open to the exterior of the crankcase and to the exterior of the cylinder housing, a seal about said conduit means at its passage through the upper partition, and separate seals about the piston rod at its passage through the upper and lower partitions.

References Cited

UNITED STATES PATENTS

| | | | |
|---|---|---|---|
| 1,852,861 | 4/1932 | Simmen | 123—41.36 |
| 1,928,033 | 9/1933 | Schaer | 123—41.36 |
| 3,230,941 | 1/1966 | Hofmann | 123—41.36 |

WENDELL E. BURNS, *Primary Examiner.*